(12) United States Patent
Chen et al.

(10) Patent No.: US 6,437,936 B1
(45) Date of Patent: Aug. 20, 2002

(54) REPEATABLE RUNOUT COMPENSATION USING A LEARNING ALGORITHM WITH SCHEDULED PARAMETERS

(75) Inventors: YangQuan Chen; LeeLing Tan; KianKeong Ooi; Qiang Bi; KokHiang Cheong, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/489,532

(22) Filed: Jan. 21, 2000

Related U.S. Application Data

(60) Provisional application No. 60/145,499, filed on Jul. 23, 1999.

(51) Int. Cl.[7] .............................................. G11B 5/596
(52) U.S. Cl. .................................. 360/77.04; 367/78.09
(58) Field of Search .......................... 360/25, 31, 53, 360/77.04, 78.09

(56) References Cited

U.S. PATENT DOCUMENTS

| | | | |
|---|---|---|---|
| 3,725,764 A | 4/1973 | Oswald | ........................ 318/629 |
| 3,863,124 A | 1/1975 | Pierce et al. | .................. 318/638 |

(List continued on next page.)

FOREIGN PATENT DOCUMENTS

| | | |
|---|---|---|
| DE | 3900683 A | 1/1989 |
| EP | 0 130 248 A1 | 1/1985 |
| EP | 0 540 114 A1 | 5/1993 |
| EP | 0 549 814 A1 | 7/1993 |
| GB | 2 060 217 A | 4/1981 |
| WO | WO 91/06096 | 5/1991 |
| WO | WO 93/06595 | 4/1993 |
| WO | WO 97/45833 | 12/1997 |

OTHER PUBLICATIONS

Recording Properties of Multilayered Thin Film Media, by D.C. Palmer, K.E. Johnson, E.Y. Wu, and J.V. Peske, IEEE Transactions On Magnetics, vol. 27, No. 6, Nov. 1991, pp. 5307–5309.

Evolution of The Soft Error Rate Model, by P. Hardy and D.J. Malone, IEEE Transactions On Magnetics, vol. 27, No. 6, Nov. 1991, pp. 5313–5315.

(List continued on next page.)

*Primary Examiner*—Regina Neal Holder
(74) *Attorney, Agent, or Firm*—Westman, Champlin & Kelly

(57) ABSTRACT

A method and apparatus for compensating for written-in repeatable runout in a disc drive is provided. Compensation values are determined through an iterative learning process in which parameters of the learning process such as learning gain, servo loop gain, etc. are functions of the iteration number. The learning process also employs a nominal double integrator model of an actuator of the disc storage system. The learning process is also a function of a zero-phase low-pass filter.

19 Claims, 3 Drawing Sheets

U.S. PATENT DOCUMENTS

| | | | |
|---|---|---|---|
| 3,914,541 A | 10/1975 | Elliott | 178/6.6 |
| 4,030,132 A | 6/1977 | Iftikar et al. | 360/78 |
| 4,103,314 A | 7/1978 | Case | 360/78 |
| 4,135,217 A | 1/1979 | Jacques et al. | 360/77 |
| 4,149,199 A | 4/1979 | Chick et al. | 360/77 |
| 4,217,612 A | 8/1980 | Matla et al. | 360/78 |
| 4,314,295 A | 2/1982 | Frandsen | 360/106 |
| 4,329,712 A | 5/1982 | Lang | 358/128.5 |
| 4,355,266 A | 10/1982 | Pearson | 318/85 |
| 4,371,960 A | 2/1983 | Kroiss | 369/43 |
| 4,396,961 A | 8/1983 | Prasad et al. | 360/78 |
| 4,414,589 A | 11/1983 | Oliver et al. | 360/77 |
| 4,456,934 A | 6/1984 | Wedman et al. | 360/78 |
| 4,485,418 A | 11/1984 | Bremmer | 360/77 |
| 4,497,047 A | 1/1985 | Fujiie et al. | 369/45 |
| 4,513,333 A | 4/1985 | Young et al. | 360/77 |
| 4,524,397 A | 6/1985 | Bond | 360/75 |
| 4,562,494 A | 12/1985 | Bond | 360/75 |
| 4,575,776 A | 3/1986 | Stephens et al. | 360/78 |
| 4,605,977 A | 8/1986 | Matthews | 360/103 |
| 4,616,276 A | 10/1986 | Workman | 360/77 |
| 4,620,244 A | 10/1986 | Krause | 360/77 |
| 4,620,252 A | 10/1986 | Bauck et al. | 360/106 |
| 4,633,345 A | 12/1986 | Keener | 360/77 |
| 4,636,885 A | 1/1987 | Yamada et al. | 360/78 |
| 4,677,602 A | 6/1987 | Okano et al. | 369/32 |
| 4,679,103 A | 7/1987 | Workman | 360/77 |
| 4,697,127 A | 9/1987 | Stich et al. | 318/561 |
| 4,697,213 A | 9/1987 | Kitamura | 360/78 |
| 4,706,250 A | 11/1987 | Patel | 371/39 |
| 4,727,533 A | 2/1988 | Erbert | 369/112 |
| 4,764,860 A | 8/1988 | Takao | 369/43 |
| 4,786,990 A | 11/1988 | Overton et al. | 360/65 |
| 4,788,608 A | 11/1988 | Tsujisawa | 360/77 |
| 4,791,599 A | 12/1988 | Hethuin et al. | 364/728.07 |
| 4,803,572 A | 2/1989 | Haruna et al. | 360/60 |
| 4,816,938 A | 3/1989 | Cowen et al. | 360/75 |
| 4,822,139 A | 4/1989 | YshiZumi | 350/257 |
| 4,878,135 A | 10/1989 | Makino et al. | 360/78.04 |
| 4,897,840 A | 1/1990 | Weiss et al. | 371/40.1 |
| 4,924,165 A | 5/1990 | Kohno | 318/592 |
| 4,947,272 A | 8/1990 | Yokozawa | 360/77 |
| 4,956,831 A | 9/1990 | Sarraf et al. | 369/32 |
| 4,965,782 A | 10/1990 | Mathews | 369/48 |
| 5,046,060 A | 9/1991 | Chow et al. | 369/44.32 |
| 5,055,731 A | 10/1991 | Nihei et al. | 310/309 |
| 5,056,074 A | 10/1991 | Tateishi et al. | 369/44.28 |
| 5,062,023 A | 10/1991 | Squire | 360/78.04 |
| 5,073,885 A | 12/1991 | Ito et al. | 369/44.28 |
| 5,081,552 A | 1/1992 | Glaser et al. | 360/98.01 |
| 5,089,757 A | 2/1992 | Wilson | 318/560 |
| 5,122,718 A | 6/1992 | Sawata | 318/621 |
| 5,146,372 A | 9/1992 | Cronch et al. | 360/51 |
| 5,155,422 A * | 10/1992 | Sidman et al. | 318/560 |
| 5,161,077 A | 11/1992 | Jabbari | 360/106 |
| 5,164,863 A | 11/1992 | Janz | 360/57 |
| 5,185,681 A | 2/1993 | Volz et al. | 360/77.05 |
| 5,189,578 A | 2/1993 | Mori et al. | 360/106 |
| 5,197,058 A | 3/1993 | Bell, Jr. et al. | 369/44.28 |
| 5,198,948 A | 3/1993 | Stover et al. | 369/124 |
| 5,204,793 A | 4/1993 | Plonczak | 360/97.01 |
| 5,216,559 A | 6/1993 | Springer | 360/106 |
| 5,233,487 A | 8/1993 | Christensen et al. | 360/77.04 |
| 5,241,433 A | 8/1993 | Anderson et al. | 360/77.04 |
| 5,247,501 A | 9/1993 | Hashimoto et al. | 369/44.11 |
| 5,257,149 A | 10/1993 | Meyer | 360/78.14 |
| 5,274,511 A | 12/1993 | Ikeda | 360/55 |
| 5,287,225 A | 2/1994 | Jorgenson | 360/106 |
| 5,287,234 A | 2/1994 | Suzuki | 360/78.04 |
| 5,299,026 A | 3/1994 | Vincett et al. | 358/401 |
| 5,303,105 A | 4/1994 | Jorgenson | 360/106 |
| 5,305,160 A | 4/1994 | Funches et al. | 360/78.07 |
| 5,311,378 A | 5/1994 | Williams et al. | 360/77.03 |
| 5,367,513 A | 11/1994 | Bates et al. | 369/44.29 |
| 5,379,171 A | 1/1995 | Morehouse et al. | 60/10.5 |
| 5,400,201 A | 3/1995 | Pederson | 360/135 |
| 5,404,253 A * | 4/1995 | Painter | 360/77.04 |
| 5,416,658 A | 5/1995 | Sega et al. | 360/106 |
| 5,444,582 A | 8/1995 | Suzuki | 360/78.09 |
| 5,444,583 A | 8/1995 | Ehrlich et al. | 360/78.9 |
| 5,455,724 A | 10/1995 | Suzuki et al. | 360/77.04 |
| 5,465,182 A | 11/1995 | Ishikawa | 360/75 |
| 5,465,183 A | 11/1995 | Hattori | 360/78.9 |
| 5,521,773 A | 5/1996 | Suzuki et al. | 360/77.4 |
| 5,521,778 A | 5/1996 | Boutaghou et al. | 360/106 |
| 5,523,902 A | 6/1996 | Pederson | 360/77.8 |
| 5,535,072 A | 7/1996 | Witt et al. | 360/99.06 |
| 5,539,714 A | 7/1996 | Andres Jr. et al. | 369/44.26 |
| 5,541,784 A | 7/1996 | Cribbs et al. | 360/75 |
| 5,550,685 A | 8/1996 | Drouin | 360/77.08 |
| 5,553,086 A | 9/1996 | Sompel et al. | 371/47.1 |
| 5,576,909 A | 11/1996 | Dierkes et al. | 360/78.09 |
| 5,585,976 A | 12/1996 | Pham | 360/77.04 |
| 5,602,689 A | 2/1997 | Kadlec et al. | 360/78.04 |
| 5,608,586 A | 3/1997 | Sri-Jayantha et al. | 360/77.04 |
| 5,610,487 A | 3/1997 | Hutsell | 318/560 |
| 5,610,777 A | 3/1997 | Dang et al. | 360/77.03 |
| 5,638,230 A | 6/1997 | Kadlec | 360/78.04 |
| 5,646,797 A | 7/1997 | Kadlec et al. | 360/75 |
| 5,648,738 A | 7/1997 | Welland et al. | 327/307 |
| 5,675,450 A | 10/1997 | Kadlec | 360/70.09 |
| 5,677,809 A | 10/1997 | Kadlec | 360/78.09 |
| 5,680,272 A | 10/1997 | Kadlec et al. | 360/78.04 |
| 5,684,650 A | 11/1997 | Kadlec et al. | 360/77.06 |
| 5,706,265 A | 1/1998 | Bang | 369/50 |
| 5,708,581 A | 1/1998 | Martinez | 364/164 |
| 5,754,354 A | 5/1998 | Tomita et al. | 360/61 |
| 5,774,294 A | 6/1998 | Fioravanti | 360/75 |
| 5,774,297 A | 6/1998 | Hampshire et al. | 360/77.04 |
| 5,793,559 A | 8/1998 | Shepherd et al. | 360/78.09 |
| 5,796,535 A | 8/1998 | Tuttle et al. | 360/51 |
| 5,796,542 A | 8/1998 | Szeremeta | 360/77.02 |
| 5,815,332 A | 9/1998 | Suzuki et al. | 360/48 |
| 5,822,147 A | 10/1998 | Kisaka | 360/77.08 |
| 5,825,578 A | 10/1998 | Shrinkle et al. | 360/77.08 |
| 5,826,338 A | 10/1998 | Chilton et al. | 30/90.1 |
| 5,828,515 A | 10/1998 | Kim | 360/78.06 |
| 5,835,300 A | 11/1998 | Murphy et al. | 360/77.05 |
| 5,835,302 A | 11/1998 | Funches et al. | 360/78.07 |
| 5,844,743 A | 12/1998 | Funches et al. | 360/77.04 |
| 5,854,722 A | 12/1998 | Cunningham et al. | 360/77.04 |
| 5,883,749 A | 3/1999 | Park | 360/75 |
| 5,886,846 A * | 3/1999 | Pham et al. | 360/78.04 |
| 5,898,286 A | 4/1999 | Clare et al. | 318/569 |
| 5,926,338 A | 7/1999 | Jeon et al. | 360/77.04 |
| 5,940,239 A | 8/1999 | Lee et al. | 360/77.02 |
| 5,949,605 A | 9/1999 | Lee et al. | 360/77.04 |
| 5,949,608 A | 9/1999 | Hunter | 360/78.09 |
| 5,956,201 A | 9/1999 | Pham et al. | 360/78.09 |
| 5,969,494 A | 10/1999 | Kang | 318/610 |
| 5,978,169 A | 11/1999 | Woods | 360/77.04 |
| 6,310,742 B1 * | 10/2001 | Nazarian et al. | 360/77.04 |

OTHER PUBLICATIONS

Error Rate Performance of Experimental Gigabit Per Square Inch Recording Components, by T.D. Howell, D.P. McCown, T.A. Diola, Y. Tang, K.R. Hense, and R.L. Gee, IEEE Transactions On Magnetics, vol. 26, No. 5, Sep. 1990, pp. 2298–2302.

A Track Density Model for Magnetoresistive Heads Considering Erase Bands, by J.K. Lee and P.I. Bonyhard, IEEE Transactions On Magnetics, vol. 26, No. 5, Sep. 1990, pp. 2475–2477.

Demonstration Of 500 Megabits Per Square Inch With Digital Magnetic Recording, by Roy A. Jensen, Joost Mortelmans, and Robin Hauswitzer, IEEE Transactions On Magnetics, vol. 26, No. 5, Sep. 1990, pp. 2169–2171.

IBM's Next Generation Magnetoresistive Heads, 1987.

*Magnetoresistive Read Magnetic Recording Head Offtrack Performance Assessment*, by P.I. Bonyhard and J.K. Lee, IEEE Transactions on Magnetics, vol. 26, Nov. 1990, pp.2448 –2450.

*Design Issues For Practical Rigid Disk Magetorsistive Heads*, by P. I. bonyhard. IEEE, Transactions On Magnetics, vol. 26, No. 6, Nov. 1990, pp. 3001–3003.

*TMR and Squeeze at Gigabit Areal Densities*, by Patrick C. Arnett and Don McCown, IEEE Transactions on Magnetics, vol. 28, No. 4, Jul. 1992, pp.1984–1986.

*Window–Shifting Mechanism In Data Separator*, IBM Technical Disclosure Bulletin, vol. 30, No. 6, Nov. 1987.

"Automated Tuning concepts for Iterative Learning and Repetitive control Laws" by R. Longman et al., *Proceedings of the 37th IEEE Conference on Decision and Control*, pp. 192–198, (Aug.1998).

\* cited by examiner

ID="1" /># REPEATABLE RUNOUT COMPENSATION USING A LEARNING ALGORITHM WITH SCHEDULED PARAMETERS

CROSS-REFERENCE TO CO-PENDING APPLICATION

This application claims priority benefits from U.S. provisional patent application Ser. No. 60/145,499, filed Jul. 23, 1999, and entitled "A ZAP COMPENSATION ALGORITHM USING SCHEDULED PARAMETERS (SP)".

FIELD OF THE INVENTION

The present invention relates generally to disc drive data storage systems. More particularly, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position. A multi-rate servo system samples the position of the head relative to a particular track at a particular sampling rate and adjusts the position of the head at a rate that is a multiple of the sampling rate by estimating the position of the head between the measured position samples.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as a track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high frequency changes in the path defined by the servo fields.

Written-in errors are often referred to as repeatable runout errors because they cause the same errors each time the head moves along a track. As track densities increase, these repeatable runout errors begin to limit the track pitch. Specifically, variations between the ideal track path and the actual track path created by the servo fields can result in an inner track path that interferes with an outer track path. This is especially acute when a first written-in error causes a head to be outside of an inner track's ideal circular path and a second written-in error causes the head to be inside of an outer track's ideal circular path. To avoid limitations on the track pitch, a system is needed to compensate for repeatable runout errors.

The present invention provides a solution to this and other problems and offers other advantages over the prior art.

SUMMARY OF THE INVENTION

The present invention offers a method and apparatus for compensating for written-in repeatable runout in a disc drive which solves the aforementioned problems. In one aspect, repeatable runout (RRO) errors in a disc drive having a servo loop for positioning a head relative to a track on a disc surface of a rotating disc using compensation values. Compensation values can be determined through a learning process which uses a nominal value ($P_n$) of an actuator of the disc drive. In another aspect, the learning process is an iterative process and the learning gain is a function of a learning iteration number. In another aspect, a gain of the servo loop is a function of a learning iteration number. In yet another aspect, the learning process includes a zero-phase low-pass filter.

DETAILED DESCRIPTION OF ILLUSTRATIVE EMBODIMENTS

Figure 1:
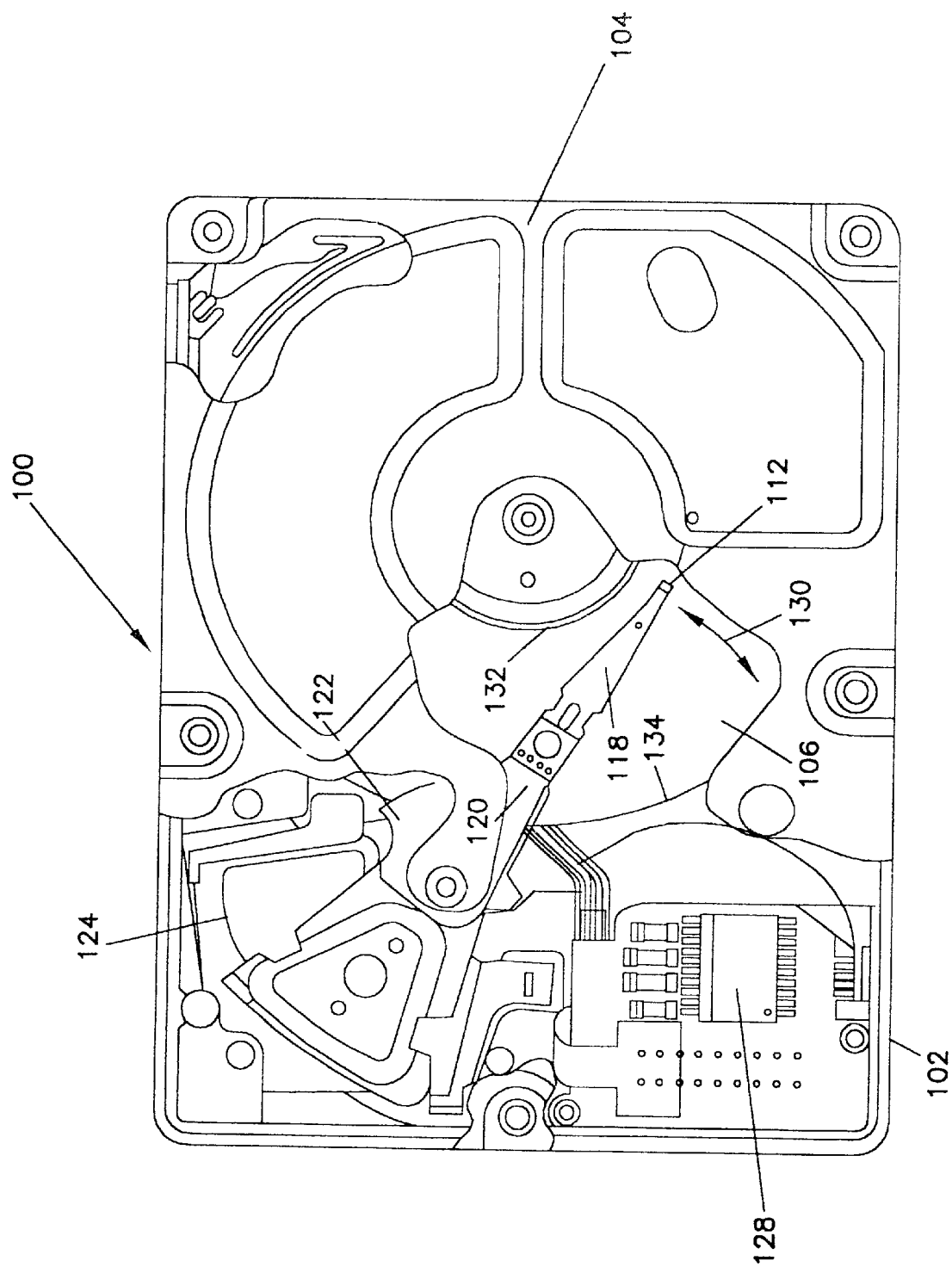
FIG. 1 is a plan view of a disc drive of the present invention.

FIG. 1 is a plan view of a disc drive 100 that includes a housing with a base plate 102 and a top cover 104 (sections of top cover 104 are removed for clarity). Disc drive 100 further includes a disc pack 106, which is mounted on a spindle motor (not shown). Disc pack 106 can include a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal and a slider, which carries one or more read and write heads. Each HGA 112 is supported by a suspension 118 which is in turn attached to a track accessing arm 120 known generally as a fixture, of an actuator assembly 122.

Actuator assembly 122 is rotated about a shaft 126 by a voice coil motor 124, which is controlled by servo control circuitry within internal circuit 128. HGA 112 travels in an arcuate path 130 between a disc inner diameter 132 and a disc outer diameter 134. When the head is properly positioned, write circuitry within internal circuitry 128 encodes data for storage on the disc and sends an encoded signal to the head in HGA 112, which writes the information to the disc. At other times, the read head in HGA 112 reads stored information from the disc and provides a recovered signal to detector circuitry and decoder circuitry within internal circuitry 128 to produce a recovered data signal.

Figure 2:
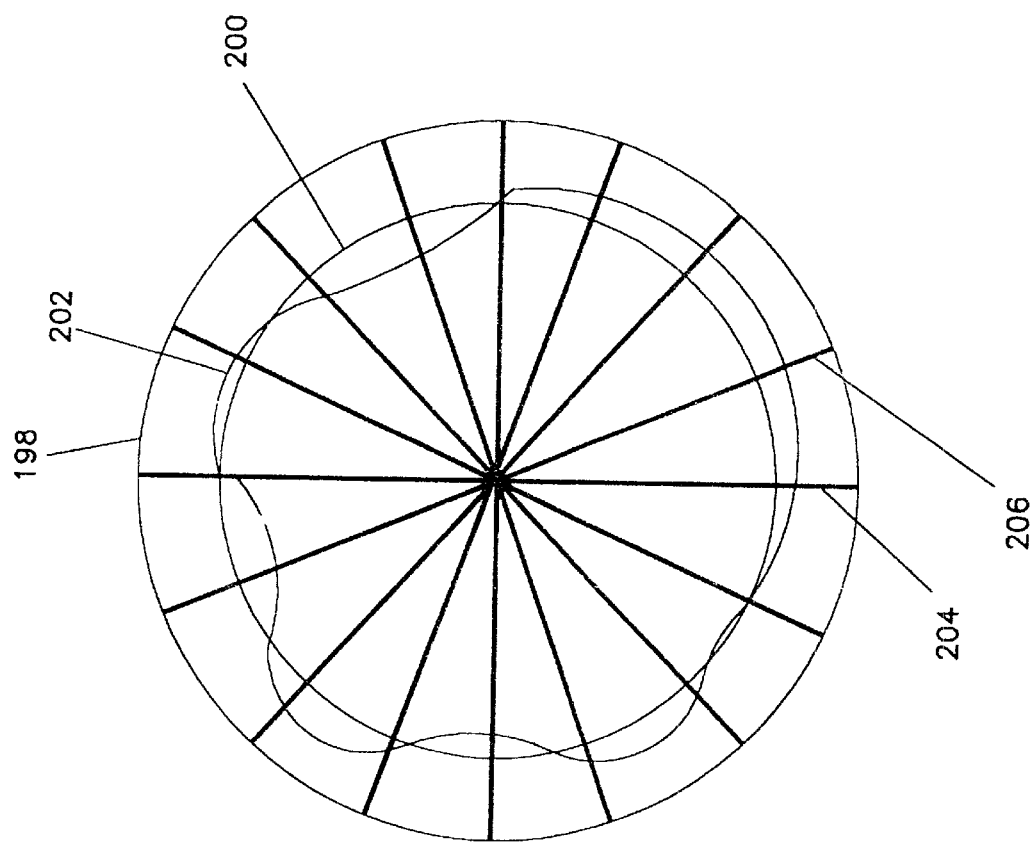
FIG. 2 is a top view of a section of a disc showing an ideal track and a realized written-in track.

FIG. 2 is a top view of a section 198 of a disc showing an ideal, perfectly circular track 200 and an actual track 202. Section 198 includes a plurality of radially extending servo fields such as servo fields 204 and 206. The servo fields include servo information that identifies the location of actual track 202 along disc section 198.

Any variation in the position of a head away from circular track 200 is considered a position error. The portions of track 202 that do not follow circular track 200 create written-in repeatable runout position errors. A position error is considered a repeatable runout error if the same error occurs each time the head passes a particular circumferential location on the disc. Track 202 creates a repeatable runout error because each time a head follows the servo fields that define track 202, it produces the same position error relative to ideal track 200.

Under the present invention, a head attempting to write to or read from track 202 will not follow track 202 but instead will more closely follow perfectly circular track 200. This is accomplished using a compensation signal that prevents the servo system from tracking repeatable runout errors resulting from the irregular shape of track 202.

As described in the Background section, one of the major head positioning error sources is the repeatable disturbance caused by spindle motor and written-in error during servo writing (WI-RRO, i.e., the Repeatable Runout (RRO) written in by the Servo Track Writer). Another error source is the non-repeatable disturbance caused by sources such as spindle ball bearing defects, rocking modes, disk vibration and so on. A number of methods have been proposed to address repeatable disturbances. These methods can be categorized into two groups. In the first group, such as AFC (adaptive feedforward compensation), errors are rejected by feedforward terms generated outside the main feedback loop. A disadvantage of these methods is their intensive computational load, especially when the rejection of multiple disturbances is required. In the second group, error rejection signals are generated inside the feedback loop. One method is internal-model-based repetitive control. This has been demonstrated to be effective in rejecting repeatable disturbances in hard disk drives. However, this approach tends to amplify non-repeatable disturbances which are at frequencies between those of the repeatable disturbances.

To address WI-RRO, a possible approach is referred to as the Zero Acceleration Path (ZAP) concept which is often referred to as Repeatable Runout Compensation. It is a non-adaptive feedforward technique to compensate the WI-RRO in front of the feedback controller C(s). This is different with AFC (adaptive feedforward compensation) technique for rejecting RRO induced by the spindle motor. In AFC the compensation occurs after the feedback controller C(s).

To understand the ZAP concept, consider FIG. 2. The track 202 represents the track center after the servo write process. Because of the various disturbances which occurred during the servo writing process, the track center is not ideally smooth and is difficult to follow by the actuator. This will result in a repeatable Position Error Signal (PES). However, if an appropriate correction amount is subtracted from the position measurement signal at each servo sector/sample, the original zigzag path becomes smooth, i.e. the track center becomes a perfect circle such as track 200. If the non-repeatable position disturbances are ignored, this perfectly circular track center can be followed with "zero actuator acceleration" (ZAP) technique.

The improvement achieved by the ZAP concept depends on the accuracy of the correction values that are subtracted from the position measurement samples at respective sectors. The ZAP correction value versus sector for each track is a deterministic profile which can also be regarded as a deterministic time function when the spindle motor velocity is kept constant. Determining this profile is actually a curve identification problem in a dynamic system, which in turn can be regarded as an optimal control or dynamic optimization problem.

Several different techniques can be used to extract the deterministic WI-RRO profiles, or to compute the correction values. However, typical procedures involve complicated calculations, and require many revolutions for each track. Therefore, a practical and inexpensive implementation of the ZAP concept has been difficult. The challenge is to find a practically implementable method to determine the ZAP profile. The computations should be easily implementable in a cheaper processor, and satisfactory accuracy should be achieved within 10 revolutions.

Figure 3:
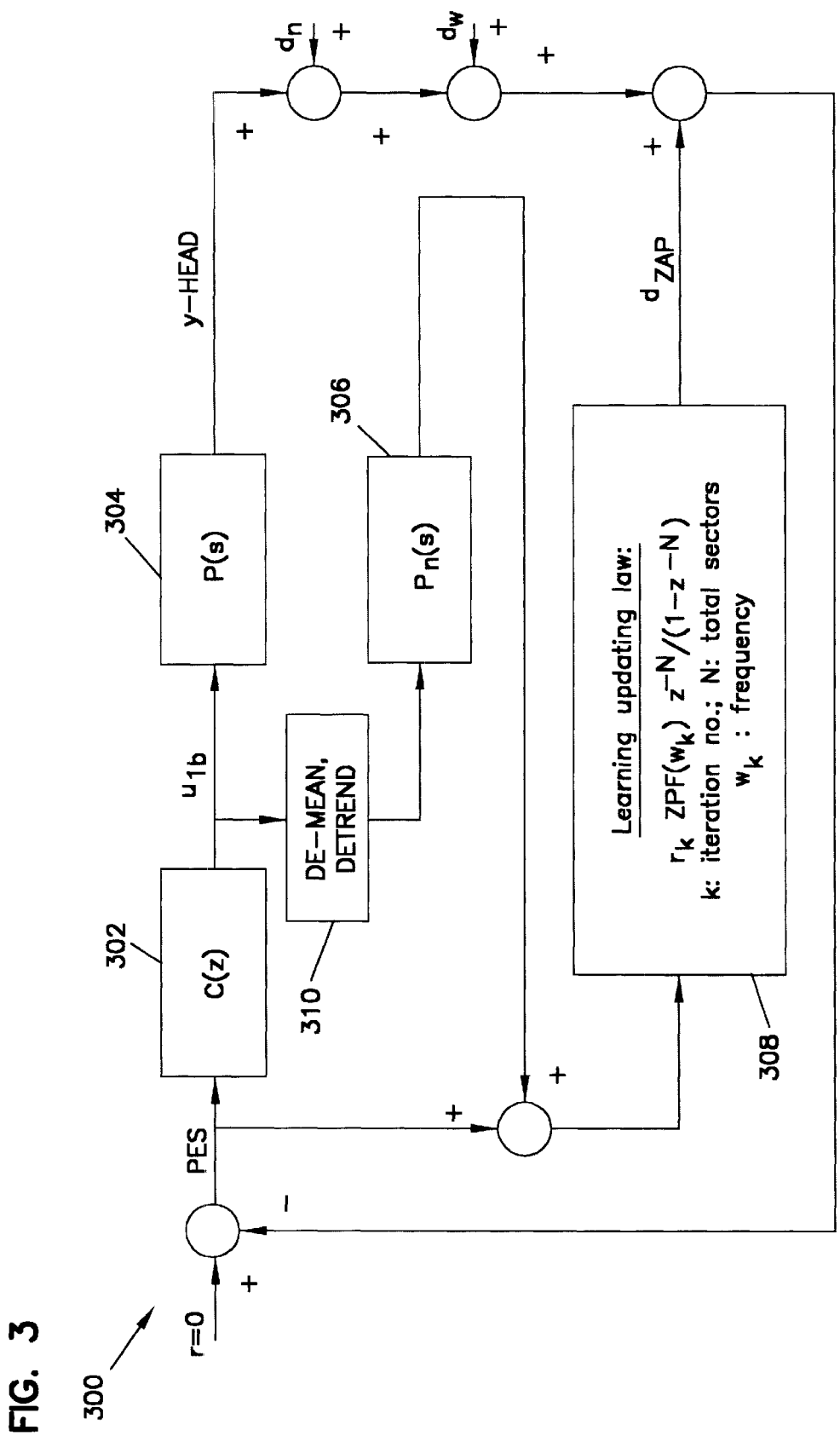
FIG. 3 is a block diagram of a learning process for a servo loop in accordance with the present invention.

FIG. 3 is a simplified block diagram of a servo control system 300 in accordance with one embodiment of the invention. Control system 300 includes a servo controller 302 identified as C(z). Actuator 304 is modeled as P(s) and a nominal model of the actuator 306 is modeled as $P_n(s)$. ZAP compensation values are determined in accordance with a learning updating law 308. The simplified block diagram of FIG. 3 shows servo controller system 300. One difference comparison to other techniques is the use of the nominal model $P_n(s)$ of the voice coil motor (actuator) VCM for ZAP profile learning. In FIG. 3, the position disturbance signal which is superimposed on the actual head position $Y_{head}$, has a repeatable ($d_w$) component and a non-repeatable ($d_n$) component. The updating law for ZAP profile learning is given by:

$$d_{ZAP}^{k+1}(t) = d_{ZAP}^k(t) + \gamma_k \text{ZPF}(\omega_k, z, z^{-1})[\text{PES}_k + P_n(s)u_{fn}] \quad \text{EQ. (1)}$$

where $d_{ZAP}^k(t)$ is the ZAP profile at the k-th learning iteration for sector number t; $\gamma_k$ is the learning gain at the k-th learning iteration; $\text{ZPF}(\omega_k, z, z^{-1})$ is a zerophase low-pass filter with a cut-off frequency $\omega_k$ scheduled for the k-th learning iteration; $\text{PES}_k$ is the positional error signal at the k-th learning iteration, $P_n(s)$ is the nominal VCM (actuator) model which is a double-integrator with a nominal gain available from measurement and $u_{fn}$ is the control signal sent to actuator 304.

In order to minimize the effect of non-repeatable runout (NRRO) on the ZAP learning performance when the SNR (signal to noise ratio: i.e., variance ratio of RRO over NRRO) is small, it is preferable to use the averaged $\text{PES}_k$ and $u_{fn}$ of several revolutions in EQ. (1). However, when servo controller is well designed and the SNR is high, such an averaging process is not required.

When the NRRO component is dominant, the temperal trend in $u_{fn}$ should be removed using de-mean, de-trend block 310. Also, the mean in $\text{PES}_k$ should be removed with block 310 before it is sent to block 306.

One aspect of the present invention includes the recognition that improved learning can be achieved using EQ. (1) in which various parameters are "scheduled", that is, the parameters change the values as a function of a learning iteration number. For example, the cutoff frequency of the zero-phase low pass filter (ZPF) can change as a function of k, the learning iteration number. For example, the cutoff frequency can change from low values (for example, several multiples of the bandwidth frequency of the servo loop) to a value of approximately the Nyquist frequency of the system. In another aspect, the gain, $\gamma_k$, of the servo loop can change as a function of the learning iteration number. For example, the gain of the servo loop can change from a smaller value to a larger value for subsequent iterations. These are referred to as "scheduled parameters." Preferably, the learning gain of EQ. (1) changes as a function of the learning iteration number. For example, the learning gain can be adjusted such that EQ. (1) initially learns the low frequency content of the written-in repeatable runout.

With the present invention, the ZAP profile can be learned in accordance with a learning update law. Preferably, the unknown but deterministic repeatable (WI-RRO) can be regarded as a virtual control input. By trying different virtual control inputs, different tracking errors, i.e., PES's are recorded. For a present trial input, i.e., $d_{ZAP}^{k+1}(t)$, the learned value is composed of previous control effort $d_{ZAP}^{k}(t)$ and the resulting tracking error $PES_k$. In general, the learning updating law can be written as:

$$d_{ZAP}^{k+1}(t) = l(d_{ZAP}^{k}(t), \ PES^{k}(t), \ u_{fh}^{k}(t)), \quad \text{EQ. (2)}$$

where $l(\bullet)$ is a learning operator in a general form. The following linear form can be used:

$$d_{ZAP}^{k+1}(t) = d_{ZAP}^{k}(t) + l(PES^{k}(t)). \quad \text{EQ. (3)}$$

In runout compensation, it can be shown that:

$$PES^{k} = \frac{1}{1 + P(s)C(z)}[r - d_{n}^{k} - d_{w} - d_{ZAP}^{k}], \quad \text{EQ. (4)}$$

where r is set point which can be considered as 0 (see FIG. 3) without loss of generality.

By iterating EQ. (4), the following is obtained:

$$PES^{k+1} = \frac{1}{1 + P(s)C(z)}[r - d_{n}^{k+1} - d_{w} - d_{ZAP}^{k}(t) - l(PES^{k}(t))] = \quad \text{EQ. (5)}$$

$$\left(1 - \frac{l}{1 + PC}\right)PES^{k} - \frac{1}{1 + PC}(d_{n}^{k+1} - d_{n}^{k}).$$

Next, denote $\rho(\omega)$ by:

$$\rho(\omega) = 1 - \frac{l}{1 + PC}(j\omega), \quad \text{EQ. (6)}$$

where $\rho(\omega)$ represents the learning rate as shown below. By iterating EQ. (4), one obtains:

$$PES^{k+1} < \rho^{k+1}(\omega)PES^{0} - \frac{1 - \rho^{k+1}(\omega)}{1 - \rho(\omega)}\frac{1}{1 + PC}\hat{d}_{n}, \quad \text{EQ. (7)}$$

where $\hat{d}_n$ is an upper bound of $d_n^{k+1} - d_n^k$, i.e., $\hat{d}_n > d_n^{k+1} - d_n^k$, $\forall t, k$. The convergence condition is obtained with:

$$\rho_{\omega} = \rho(\omega) = 1 - \frac{l}{1 + PC}(j\omega) < 1, \ \forall \ \omega < \omega_s/2, \quad \text{EQ. (8)}$$

where $\omega_s$ is the sampling frequency. Similarly, starting from EQ. (3), it can be shown:

$$d_{ZAP}^{k+1} = \rho^{k+1}(\omega)d_{ZAP}^{0} - \quad \text{EQ. (9)}$$

$$(1 - \rho(\omega))\sum_{j=0}^{k}\rho^{j}(\omega)d_{n}^{k-j} - (1 - \rho^{k+1}(\omega))d_{w} \approx -d_{w}$$

From EQ. (9), it can be shown $d_{ZAP}^{k}$ converges to $-d_w$, the WI-RRO, as long as $\rho_\omega < 1$. Without any priori information, $d_{ZAP}^{0}$ should be normally set to 0.

With the ZAP concept, it is preferable to find an iterative learning operator $l(\bullet)$ such that PES can be reduced to a desirable level in only a few learning iterations. When $\rho_\omega a$ in EQ. (8) is zero, the learning converges in only one iteration. This implies that the ideal learning operator should be chosen as:

$$l(j\omega) = 1 + P(s)C(z), \ \forall \ \omega. \quad \text{EQ. (10)}$$

However, this is not realistic since there are always uncertainties in a disc drive system. Through the use of scheduled parameters of the invention, improved learning can be achieved. Preferably, the learning gain of the present invention is scheduled to initially learn low frequency RRO. In the present invention, referring to FIG. 3, the learning operator is written as:

$$l(\bullet) = \gamma_k ZPF(\omega_k, z, z^{-1})[1 + P_n(s)C(z)]. \quad \text{EQ. (11)}$$

In one aspect, the open loop gain of the servo loop is "scheduled" during learning. Using scheduling parameters during ZAP profile learning can give additional benefits in improving the learning performance. The following provides an in-depth discussion on servo-loop-gain scheduling.

By adjusting $K_a$, the servo loop gain, during the ZAP learning process, the learning performance can be improved. Suppose at the k-th iteration, $(K_a)_k = \alpha_k K_a^*$ where $K_a^*$ is the nominal $K_a$ obtained from a system $K_a$-table (from outer to inner diameter). According to the learning updating law of EQ. (1), the learning rate is given by $$\rho = \rho(\omega)| = \left|1 - \gamma_k ZPF(\omega_k, z, z^{-1})\frac{1 + P_n C}{1 + PC}(j\omega)\right|. \quad \text{EQ. (12)}$$

As discussed above, from EQ. (12) $r_k$ and $\Omega_k$ are used for conditioning the learning rate $\rho(\omega)$ over a frequency range of interest. Now, define the sensitivity functions $$S^k(j\omega) = 1/(1 + \alpha_k PC)(j\omega), \quad \text{EQ. (13)}$$

$$S_n^k(j\omega) = 1/(1 + \alpha_k P_n C)(j\omega). \quad \text{EQ. (14)}$$

Suppose that the ZAP learning process is started with a smaller $\alpha_k$ and then increased $\alpha_k$ as the number of learning iterations increases, i.e., $$\alpha^k > \alpha^{k-1}. \quad \text{EQ. (15)}$$

For servo control systems:

$$S_n^k(j\omega) < S_n^{k-1}(j\omega), \quad \text{EQ. (16)}$$

$$S^k(j\omega) < S^{k-1}(j\omega). \quad \text{EQ. (17)}$$

It is true that at a low frequency band:

$$S^k(j\omega) < S_n^{k-1}(j\omega). \quad \text{EQ. (18)}$$

This is an significant feature, which can be used to condition the learning rate. Here, the learning rate is given by:

$$\rho = |\rho(\omega)| = \left|1 - \gamma_k ZPF(\omega_k, z, z^{-1})\frac{S^k(j\omega)}{S_n^{k-1}(j\omega)}\right|. \quad \text{EQ. (19)}$$

The loop gain scheduling is achieved by setting the loop gain before $PES/u_{fh}$ data collecting. Too aggressive a reduction in $K_a^*$ may not bring the expected improvement. However, using $\alpha_1=-3$ dB and $\alpha_2=-2$ dB typically provides improved learning.

Phase advance scheduling can be used to address mismatch between $P_n C(j\omega)$ and $PC(j\omega)$, i.e., $$\rho = |\rho(\omega)| = \left|1 - \gamma_k z^m ZPF(\omega_k, z, z^{-1}) \frac{1 + P_n C}{1 + PC}(j\omega)\right|, \quad \text{EQ. (20)}$$

where the phase advance step m is another scheduled parameter. This is particularly useful when total number of iterations is large. However, scheduling this parameter may not be particularly advantageous in ZAP profile learning because it is normally desirable to use as few as possible iterations during learning process.

In order to address high frequency noise problems, signal averaging and parameter scheduling are used. The convergence bound of PES in EQ. (4) can be reexamined. EQ. (6) can be written as:

$$PES^{k+1} = \rho^{k+1}(\omega)PES^0 - \quad \text{EQ. (21)}$$
$$\frac{1}{1+PC}\left\{d_n^{k+1} - \rho^k(\omega)d_n^0 - (1-\rho(\omega))\sum_{j=0}^{k-1}\rho^j(\omega)d_n^{k-j}\right\}.$$

Note that 1/(1+PC), the sensitivity transfer function, is actually a high-ass filter which means that $$d_n^{k+1} - \rho^k(\omega)d_n^0 - (1-\rho(\omega))\sum_{j=0}^{k-1}\rho^j(\omega)d_n^{k-j}$$

in EQ. (21) can be amplified at very high frequencies. This problem exists in all iterative learning methods. Frequency domain trade-off is required and suitable filtering is essential. However, better result is still achievable when $d_n$ has some special characteristics along the time (sector) axis as well as iteration number (revolution number) axis. For example, if $d_n$ has some repetitiveness or near zero-mean over multiple iterations (revolutions), the effect of $d_n$ can be reduced to an acceptable level using an algebraic averaging method over a number of revolutions. High-frequency amplification still exists but may not be very significant during just a number of initial iterations. The number of revolutions required in ZAP profile learning depends on SNR (the ratio of variance of RRO over NRRO). If the SNR is high, one revolution per iteration may be sufficient for the initial learning iteration(s). Typically, due to SNR and the high-frequency amplification considerations, the scheduling of parameters in the learning process can be successfully employed such that the practical constraints are met and improved compromises are made between learning rate and accuracy.

The present invention includes an apparatus and method for compensating for repeatable runout (RRO) errors in a disc drive 100 having a servo loop 300 for positioning a head 112 relative to a track 200 on disc surface of a rotating disc 198. In the invention, a servo position value is retrieved from the disc 198 which is indicative of head 112 position relative to track 200. Compensation ZAP values are retrieved from a table of compensation values and the servo position value is compensated based upon the retrieved compensation value. In one aspect, the compensation values are determined through a learning process which uses a nominal $P_n$ of an actuator of the disc drive 100. In an iterative learning process, the learning gain $\gamma_k$ is a function of a learning iteration number. Similarly, the iterative learning process is a function of a servo loop gain which is a function of an iteration number. The learning process can also include a zero-phase low-pass filter in which the cut-off frequency can be a function of an iteration number.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, other learning algorithms or techniques can be used that implement the present invention without departing from the scope and spirit of the present invention.

What is claimed is:

1. A method for compensating for repeatable runout (RRO) errors in a disc drive having a servo loop for positioning a head relative to a first track on a disc surface of a rotating disc, comprising:
   (a) retrieving a servo position value from the disc surface indication of head position relative to the track;
   (b) retrieving a compensation value $d_{ZAP}$ from a table of compensation values;
   (c) compensating the servo position value with the compensation value $d_{ZAP}$; wherein the compensation values are determined through an iterative learning process which uses a nominal $P_n$ of an actuator of the disc drive; and
   (d) providing the compensated servo position value to a controller which controls the actuator of the disc drive so that the head travels along a path that is generally more circular than the first track.

2. The method of claim 1 wherein $P_n$ is a nominal VCM transfer function, ,a double integrator with a lumped gain.

3. The method of claim 1 wherein the learning process is further a function of a servo loop gain which is a function of an iteration number.

4. The method of claim 3 wherein the servo loop gain increases with each iteration from a value lower than the nominal value.

5. The method of claim 1 wherein the learning process is a function of a zero-phase low-pass filter.

6. The method of claim 5 wherein a cutoff frequency of the zero-phase low-pass filter is a function of an iteration number.

7. The method of claim 6 wherein the cutoff frequency of the zero-phase phase low-pass filter increases with each iteration number.

8. The method of claim 1 wherein the learning process is an iterative learning process and the learning process is a function of a learning gain which is a function of iteration number.

9. The method of claim 8 wherein the learning gain is selected such that low frequency values are initially learned.

10. The method of claim 1 wherein the learning process includes a step of mean removing.

11. The method of claim 1 wherein the learning process includes removing a trend.

12. A disc storage system implementing the method of claim 1.

13. A disc storage system, comprising:
   a disc configured to rotate and including a disc surface having a track thereon;

a transducing element configured to read and write information on the disc;

an actuator configured to move the transducing element radially across the disc surface;

a servo loop including a controller configured to control movement of the actuator in response to an error signal and a compensation value so as to compensate for repeatable runout (RRO) error, the compensation value derived through an iterative learning process which uses a nominal $P_n$ of the actuator, the compensation value and the error signal applied to the controller which controls the actuator of the disc drive so that the head travels along a path that is generally more circular than the first track.

14. The disc storage system of claim 13 wherein $P_n$ is a nominal voice coil motor (VCM) transfer function comprising a double integrator with a lumped gain.

15. The disc storage system of claim 13 wherein the learning process is further a function of a servo loop gain which is a function of an iteration number.

16. The disc storage system of claim 15 wherein the servo loop gain increases with each iteration from a value lower than the nominal value.

17. The disc storage system of claim 13 wherein the learning process is a function of a zero-phase low-pass filter.

18. The disc storage system of claim 17 wherein a cutoff frequency of the zero-phase low-pass filter is a function of an iteration number.

19. The disc storage system of claim 13 wherein the learning process is an iterative learning process and the learning process is a function of a learning gain which is a function of iteration number.

* * * * *